Nov. 20, 1956        R. C. NANCE        2,771,519
ROUTINE TRUNK TEST CIRCUIT
Filed June 29, 1955                12 Sheets-Sheet 3

FIG. 3

INVENTOR
R. C. NANCE
BY
C. Mattice
ATTORNEY

Nov. 20, 1956

R. C. NANCE 2,771,519

ROUTINE TRUNK TEST CIRCUIT

Filed June 29, 1955

INVENTOR
R. C. NANCE
BY
C. Mathice

ATTORNEY

Nov. 20, 1956

R. C. NANCE 2,771,519

ROUTINE TRUNK TEST CIRCUIT

Filed June 29, 1955

INVENTOR
R. C. NANCE
BY
C. Mathie

ATTORNEY

Nov. 20, 1956　　　　　R. C. NANCE　　　　　2,771,519
ROUTINE TRUNK TEST CIRCUIT
Filed June 29, 1955　　　　　　　　　　　　12 Sheets-Sheet 9

FIG. 9

INVENTOR
R. C. NANCE
BY
C. Mathie
ATTORNEY

INVENTOR
R. C. NANCE
BY
C. Mattice
ATTORNEY

United States Patent Office 2,771,519
Patented Nov. 20, 1956

2,771,519

ROUTINE TRUNK TEST CIRCUIT

Robert C. Nance, Wood-Ridge, N. J., assignor to Bell Telephone Laboratories, Incorporated, New York, N. Y., a corporation of New York Application June 29, 1955, Serial No. 518,769

11 Claims. (Cl. 179—175.2)

This invention relates to telephone systems and has for one of its objects to facilitate the making of routine tests on telephone equipment, particularly on trunk circuits.

The present invention is directed to automatically recording the results of routine tests and employing the recording means for determining the further operation of the testing circuit. More specifically, the present invention comprises improvements on the routine trunk testing arrangement disclosed and claimed in the application of H. F. Shoffstall, Serial No. 333,760, filed January 28, 1953, which issued as Patent No. 2,719,886, on October 4, 1955, in which a plurality of tests are automatically applied to each of a large number of trunk circuits and the failure of any test causes the test circuit to cease operating, to sound an alarm and to indicate by lamp signals the identity of the trunk being tested and the nature of the test which failed.

Some test failures may indicate a transient condition and it has been customary for the test man following all failures to immediately repeat the test to determine whether the condition is transient or permanent. In addition, following other test failures, it is necessary to hold the circuit being tested in order to locate the trouble. Still other test failures may indicate a difficulty within the test equipment itself, or in the control equipment rather than a fault in the trunk connected with the test equipment.

To facilitate recording and correcting troubles, each failure is recorded by means of a teletypewriter which records the identity of the trunk being tested at the time of the failure and the point at which the failure occurred.

In accordance with a feature of the present invention, means is provided in the test circuit to indicate the class of the trouble encountered, to record the trouble and to selectively determine the further operation of the test circuit in accordance with the class of trouble indicated.

A further feature of the invention pertains to means responsive to the operation of the recorder to selectively sound an alarm, to cause the test circuit to make a repeat test on the same piece of equipment or to advance and test the next piece of equipment.

More specifically, for a particular class of failure, the first operation of the recorder may cause the test circuit to make a repeat test on the same piece of equipment and the second operation of the recorder cause the test circuit to advance the test to the next piece of equipment.

These and other features of the invention will be more clearly understood from a consideration of the following description read in connection with the drawings in which:

Fig. 1 shows the lamps for identifying troubles and the circuits being tested;

Fig. 13 shows the manner in which Figs. 1 to 12 are to be arranged.

In the drawings the relays and lamps are given functional letter designations and in the specification these designations are followed by the number of the figure in which the relays and lamps appear, the figure number being enclosed in parentheses.

Figure 2:
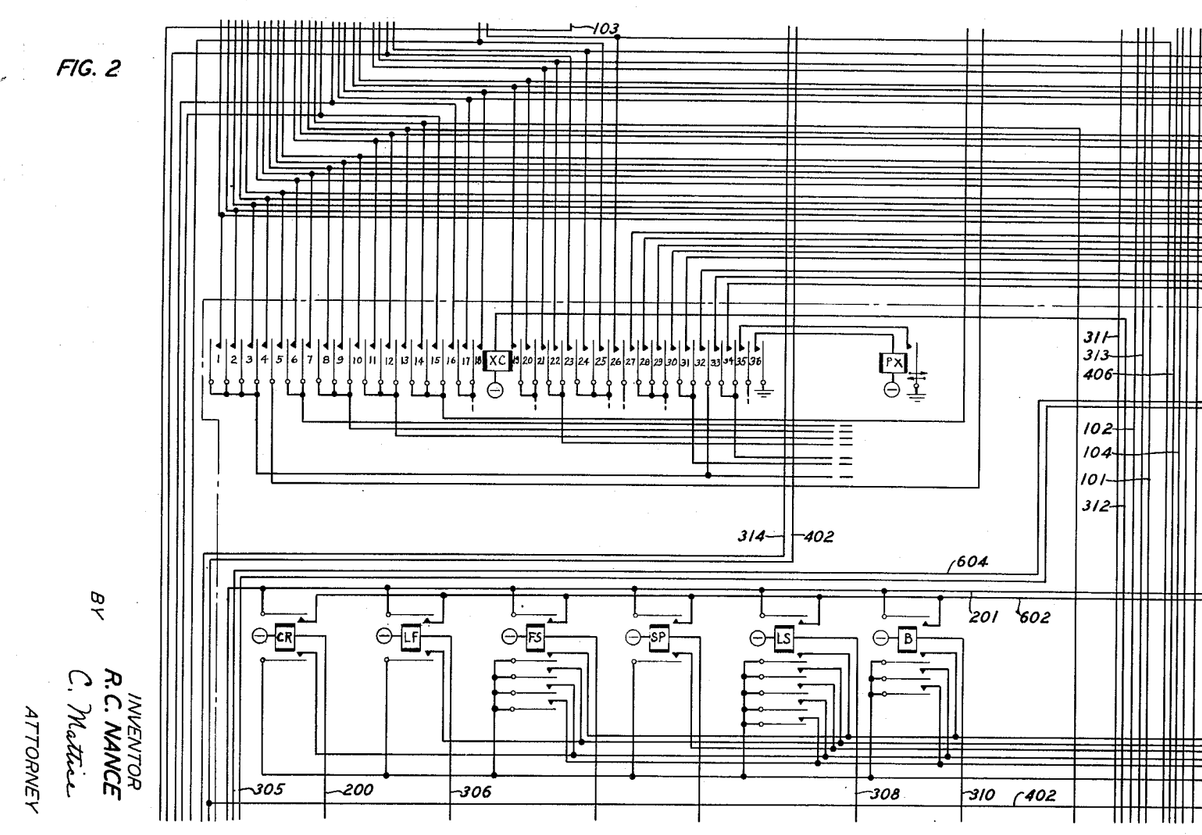
Fig. 2 shows a part of the trouble recorder including certain of the code relays.
Figure 3:
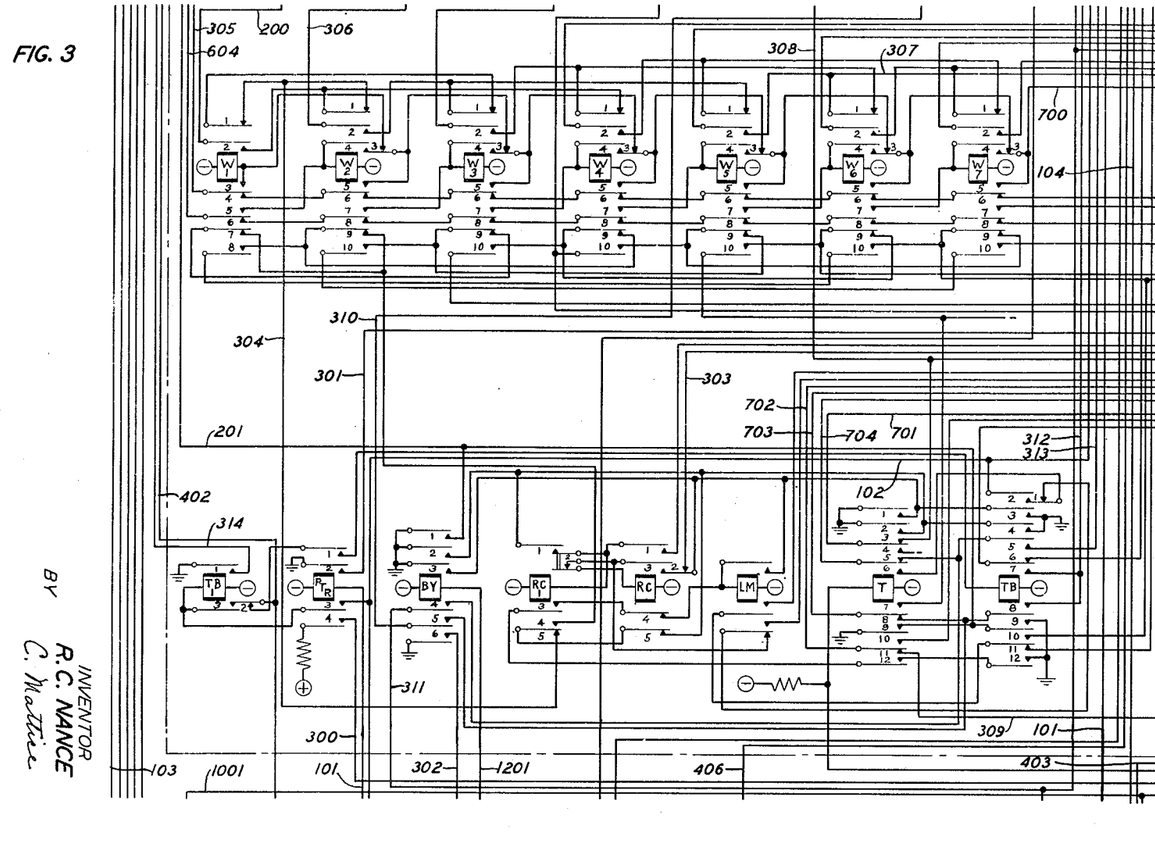
Fig. 3 shows a part of the steering and control relays for controlling the trouble recorder.
Figure 5:
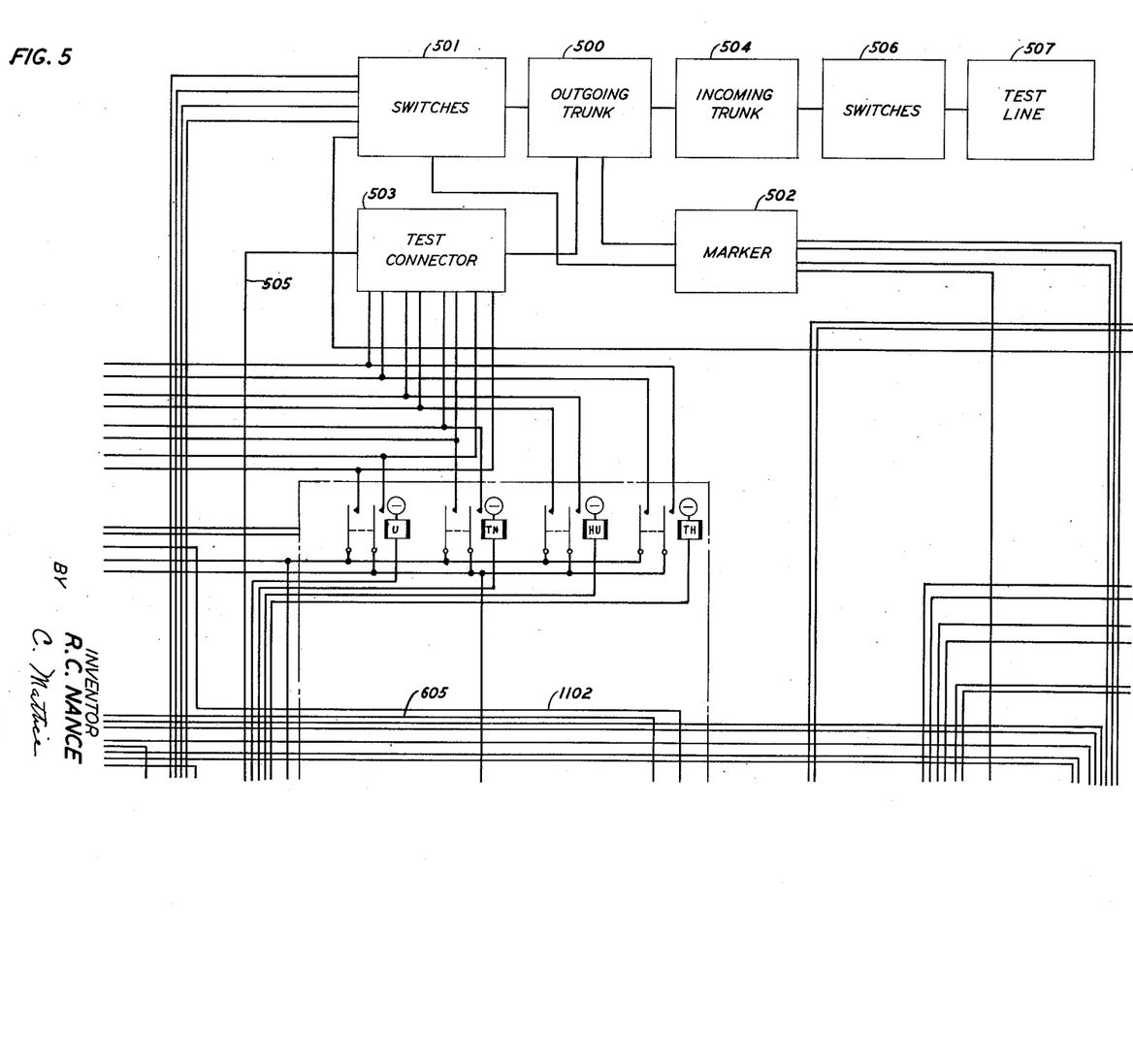
Fig. 5 shows in diagrammatic form a test connector, a trunk and the equipment employed in connecting the test circuit with the trunk to be tested.
Figure 6:
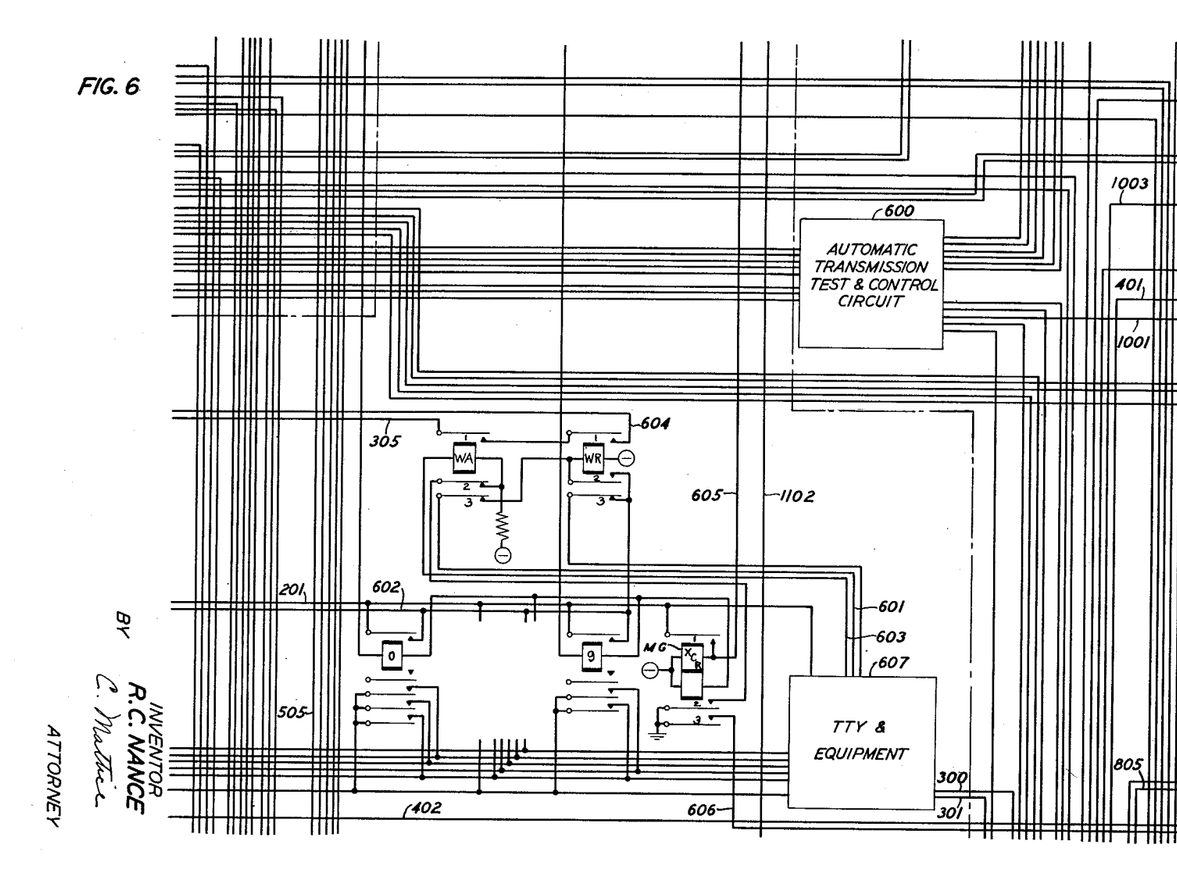
Fig. 6 shows the teletypewriter used as the trouble recorder and certain control circuits therefore.
Figure 7:
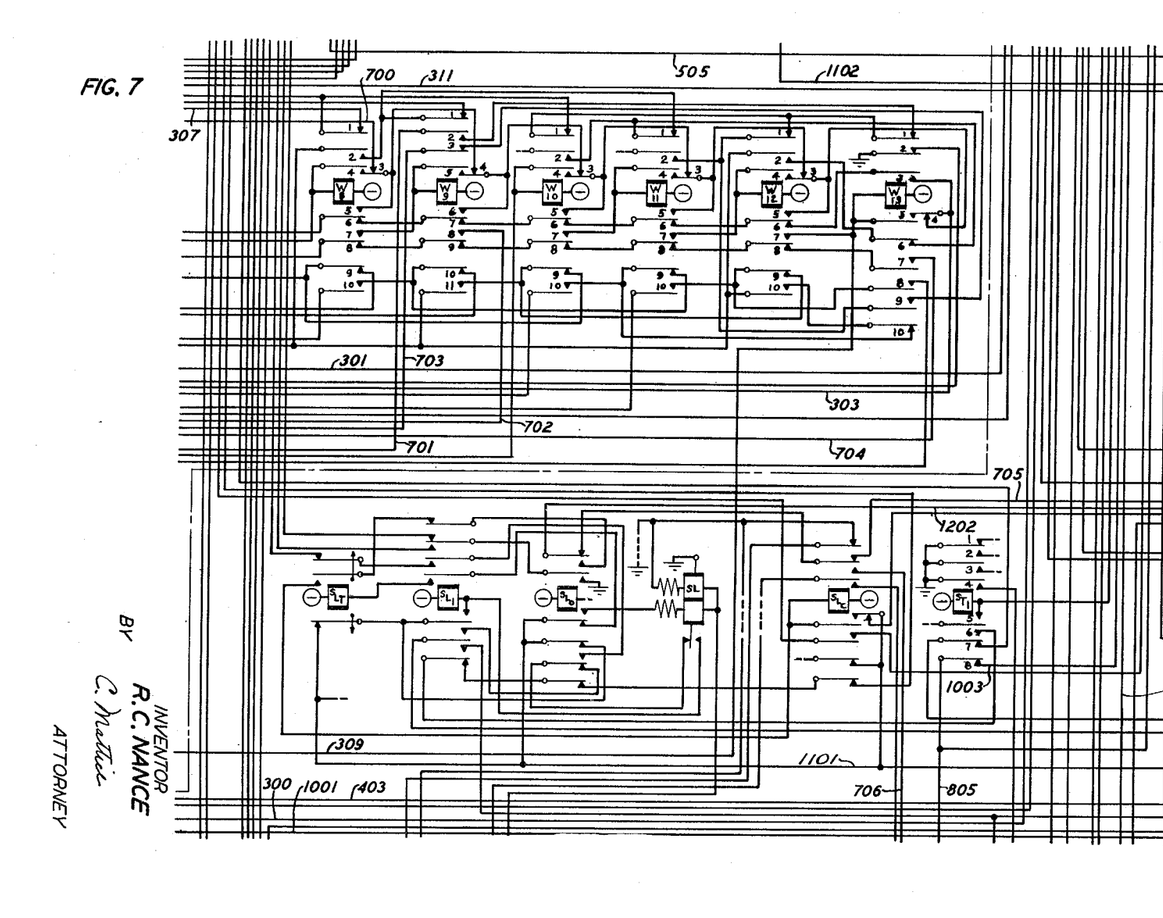
Fig. 7 shows the remaining steering relays associated with the recorder and one set of test relays of the test circuit.

Figs. 2, 3, 6 and part of Figs. 5 and 7, which show the recorder circuit have been set off by a broken line. The remaining parts of the drawing in general constitute a skeletonized showing of the disclosure of the above-identified Shoffstall patent in order to more clearly indicate the progress of the test, the points at which the various trouble lamps may be lighted, the manner in which the trouble class relays are operated, and the manner in which the trouble indications are grouped according to class as well as the means for controlling the recorder.

*Operation of the test circuit*

A brief description of the operation of the test circuit will first be given, no attempt being made to trace the circuits since they are set forth in detail in the above-identified Shoffstall patent.

Figures 1, 13:
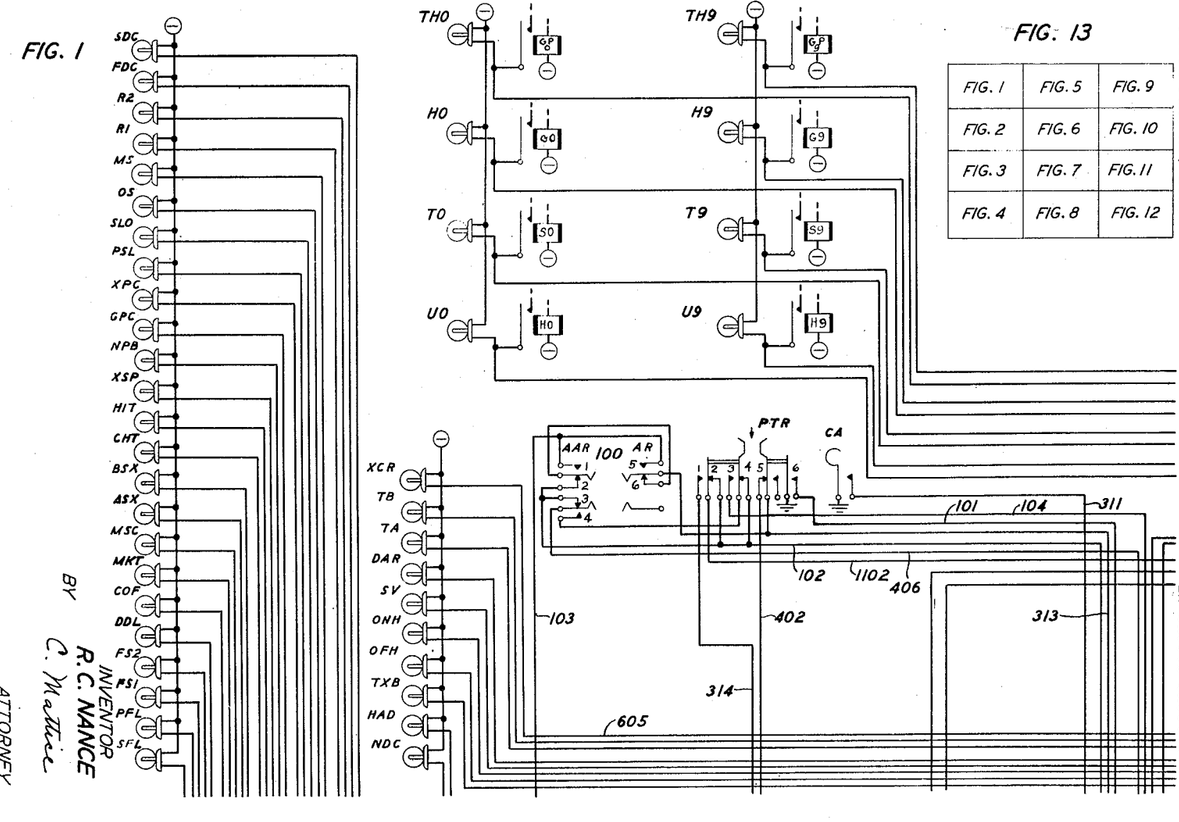

The test circuit is connected with the talking conductors of a trunk such as trunk 500 through the link switches 501 used in service connections and for this purpose employes a marker 502 to which it is connected by a connector, not shown. The test circuit obtains access to multiples of the trunk test conductors and the select magnet operating circuits of the trunks through the test connector 503. Test connector 503 comprises a plurality of crossbar switches which are selected by means of chains of relays indicated by the group relays GP0(1) and GP9(1) and subgroup relays G0(1) and G9(1). The select magnets of the selected crossbar switch are operated under the control of the chain of relays S0(1) to S9(1) while the hold magnets are operated under the control of the chain of relays H0(1) to H9(1). Each of these relays, when operated, lights a corresponding lamp to identify the trunk being tested. For example, when the test circuit is ready to test the first trunk, relays GP0(1), G0(1), S0(1) and H0(1) will be operated, in turn lighting thousands lamp TH0(1), hundreds lamp H0(1), tens lamp T0(1) and units lamp U0(1).

Figure 10:
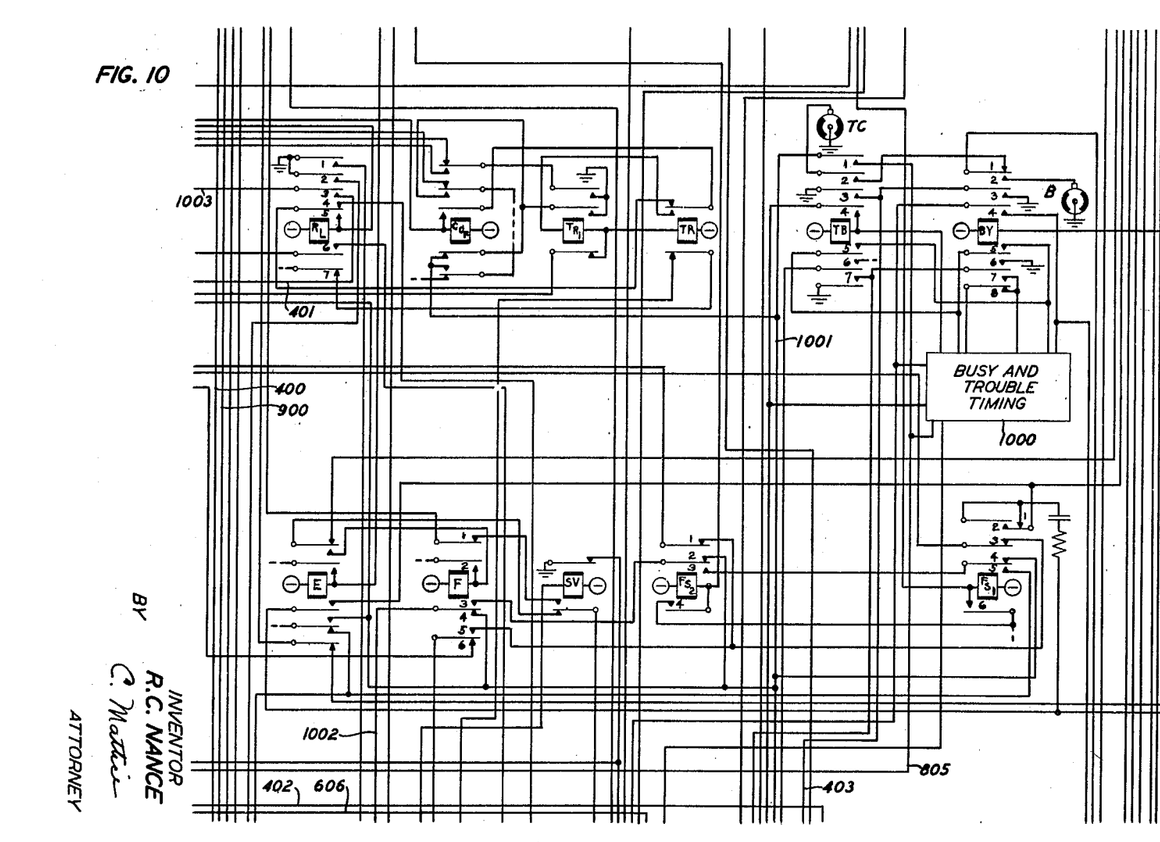
Figure 11:
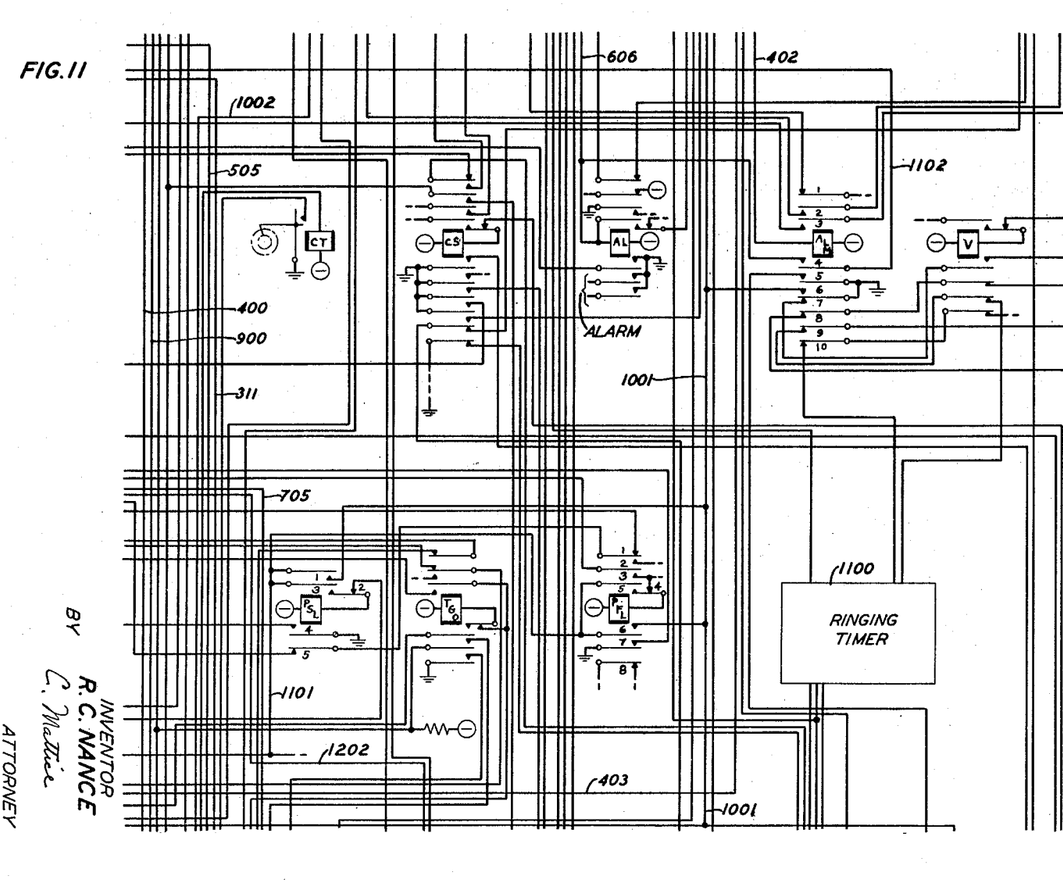
Fig. 11 shows the ringing timer and the alarm relays.

When the test is started, connector 503 is operated under the control of relays GP0(1), G0(1), S0(1) and H0(1) to establish a circuit for testing whether the first trunk to be tested is busy or idle and a busy timing operation is started by operating relay BY(10) through the busy and trouble timing circuit 1000 in its normal condition. With relay BY(10) operated, the timing circuit 1000 operates under the control of interrupter B(10) to measure a time interval. If the timing circuit 1000 completes this timing operation, certain operations take place which will be described hereinafter which result in the operation of relay AL(11) and the lighting of lamp TA(1).

Figure 12:
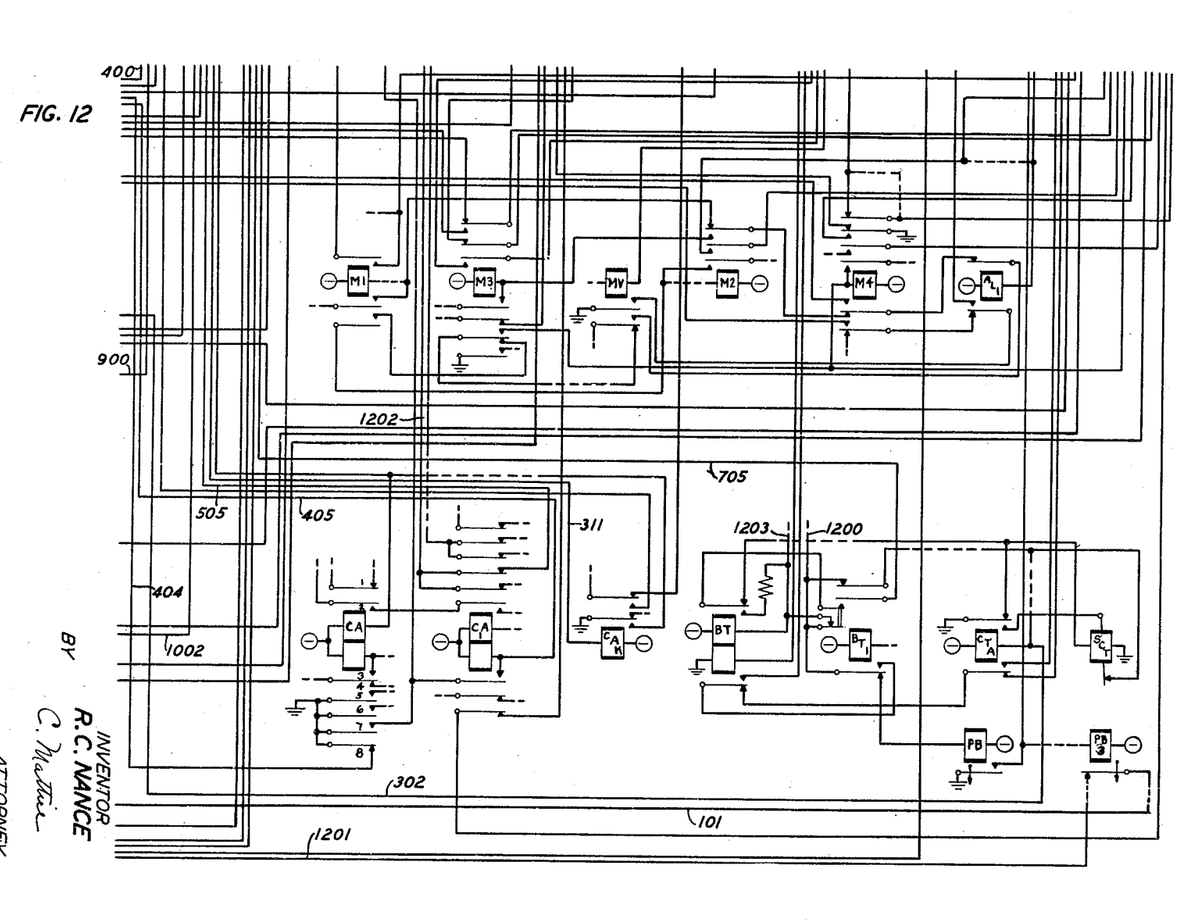
Fig. 12 shows the busy test relays and the relays which control the advance of the test connector.

As soon as the test is started, relay BT(12) operates over a back contact of relay BT1(12) and conductor 1200. After a class indication has been registered and checked, relay BT1(12) operates, first connecting the busy test conductor of the trunk to a locking circuit for relay BT(12) and then opening the operating circuit of relay BT(12) so that, if the trunk is idle relay BT(12) releases, but if the trunk is busy relay BT(12) locks as long as the trunk remains busy. The locking circuit of relay BT(12) may be traced from the trunk test conductor which is extended by test connector 503 to conductor 505, over a back contact of relay CA1(12), conductor 1202, back contact of relay SLO(7), back contact of relay SLC(7), conductor 705, front contact of relay BT1(12), front contact of relay BT(12) and resistance to the winding of relay BT(12). While relay BT(12) remains operated, lamp TB(1) is lighted. If relay BT(12) does not release before the timing circuit 1000 completes its operation, the test will be blocked and a record made as described hereinafter.

If the trunk is idle or becomes idle, the busy test relay BT(12) releases, extinguishing lamp TB(1) and lighting lamp MSC(1). The release of relay BT(12) extends the busy test conductor to the winding of relay SCT(12) to test that conductor for continuity. If relay SCT(12) operates, relay CTA(12) which had been previously operated and locked under the control of relay SCT(12) releases, extinguishing lamp MSC(1) and operating relay CS(11) to indicate the satisfactory completion of the busy and continuity tests.

Relay CS(11), when operated, initiates the connection of the test circuit with the trunk 500 through the switches 501, as fully described in the Shoffstall patent. Relay CS(11) also releases relay BY(10) to stop the busy timing operaiton and operates relay TB(10) through the timing circuit 1000, when that circuit has restored to normal, to initiate the trouble timing operation under the control of interrupter TC(10).

If, during the operation of the marker to control the connection of the test circuit with the trunk to be tested, the marker cannot complete the connection for any reason, it operates relay TR(10) which locks through the winding of relay TR1(10), relay TR1(10) operating only when the marker releases. With relay TR1(10) operated, lamp MKT(1) is lighted. If the cause of the failure to set up the connection is due to a failure to find a path through the switches, the marker also operates relay COF(10) and, with relays TR1(10) and COF(10) operated, lamp COF(1) is lighted.

While the marker is attached, it reoperates relay BT(12) over conductor 1203 and that relay remains locked to the busy test lead after the marker releases, provided ground is properly supplied through the switches to the trunk circuit. If the connection is set up successfully, the marker releases, operating relay RL(10). Relay RL(10) lights lamp OS(1) and then closes a circuit for relay ST1(7) provided relay BT(12) remains operated. If relay ST1(7) operates, lamp OS(1) is extinguished.

Figure 8:
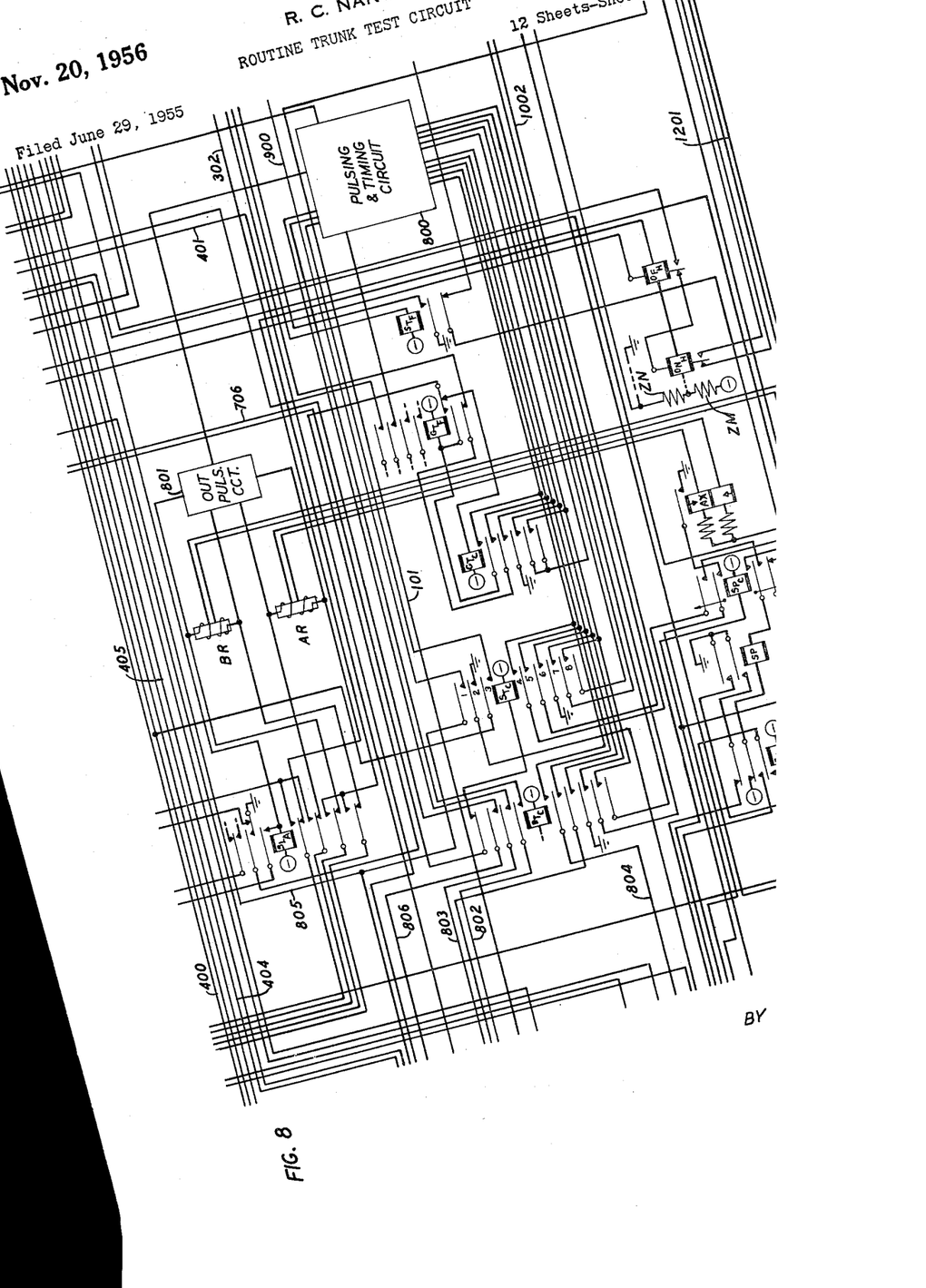
Fig. 8 shows the test progress relays and relays used for testing the trunk conductors.

The marker, while attached, also operates relay SLA(8) which locks under the control of relay SLC(7). Assuming that the trunk 500 is one requiring multifrequency pulsing, the test circuit is arranged to make a non-operate test of the outgoing sleeve relay of the trunk circuit and to accept a delay-dial signal from the trunk. For the first purpose, two wires of the trunk are connected in multiple to ground through the upper winding of relay SL(7), while for the other purpose the other two wires of the trunk are connected in multiple through the windings of relays OFH(8) and ONH(8) to a reduced battery potential supplied from a voltage divider comprising resistances ZM(8) and ZN(8). Relay SLA(8) also operates relay GTC(8) to control the pulsing and timing circuit 800 to measure a time interval.

If the incoming trunk 504, in which the outgoing trunk 500 terminates at the distant office, is not ready to receive pulses, a delay-dial signal will be passed to the outgoing trunk 500 which in turn causes the operation of relay OFH(8). If neither relay OFH(8) nor relay ONH(8) operate at this time, lamp BSX(1) is lighted. If relay OFH(8) operates, lamp DDL(1) is lighted. When the delay-dial signal is terminated, relay OFH(8) releases and relay ONH(8) operates, operating relay TGO(11) which lights lamp ONH(1). A premature subsequent off-hook signal releases relay ONH(8) and reoperates relay OFH(8) to operate relay PFL(14) and light lamps PFL(1) and OFH(1).

Relay SL(7) should operate in the pad control test circuit, in turn operating relays SL1(7) and SLT(7). If relay SL(7) fails to operate, lamp ASX(1) is lighted to indicate that the pad control simplex circuit is open. If the outgoing sleeve relay of the trunk circuit operates falsely in the non-operate test circuit, the operating circuit of relay SL(7) will be opened and that relay will release operating relay PSL(11) which lights lamp PSL(1).

When the timing operation initiated by the operation of relay GTC(8) is completed, relay GTF(8) operates, in turn operating relay SLO(7), relay SLO(7) lighting lamp SLO(1). In addition, relay SLO(7) connects the busy test conductor, which extends as above traced to conductor 1202, to the winding of relay SLC(7), operating relay SLC(7). Relay SLO(7) also connects ground through the lower winding of relay SL(7) in parallel with the circuit through the upper winding of relay SL(7) so that the incoming supervisory relay of the trunk circuit should now operate and release relay SL(7). If relay SLC(7) operates, following the operation of the trunk supervisory relay, relay SLO(7) is released, but, if relay SLC(7) fails to operate, relay SLO(7) is held operated and lamp MS(1) is lighted to indicate that the trunk failed to hold ground on the busy test conductor following the operation of the outgoing sleeve relay.

If the outgoing sleeve relay of the trunk fails to operate, or there is a false battery connection on one of the conductors connecting that relay with relay SL(7), relays SL(7) and SL1(7) will fail to release and the test circuit will time out with lamp SLO(7) lighted. Means is provided for holding relay SL1(7) operated, if relay SL(7) does not release promptly, following the closure of the operating condition to the trunk outgoing sleeve relay. If the false battery condition disappears before the test circuit times out, relay SL(7) releases but relay SL1(7) cannot release and lamp TXB(1) will be lighted to indicates a temporary cross with battery.

If the above tests are completed satisfactorily, the test circuit prepares to transmit the test line designation to the distant office and relay SLA(8) is released. With relay SLA(8) released, the trunk conductors are extended to the outpulsing circuit 801, the test line designation being transmitted to the distant office in the manner fully described in the previously mentioned Shoffstall patent.

When the transmission of the designation has been completed, relay STC(8) is operated to prepare the test circuit from making ringing and supervisory tests. At this time lamp SV(1) is lighted over the back contact of relay SV(10) indicating that the test circuit is waiting for a test line. With relay SLA(8) released, one pair of trunk conductors is extended through the retard coil AR(8) and the windings of relay AX(8) to battery through the winding of relay SV(10) while the other pair of trunk conductors is extended through retard coil BR(8) to the contacts of the ringing control relay R(4) and over the back contacts of that relay to the windings of relay BXA(4). No circuit is completed over these conductors at this time.

When the trunk has been extended through switches 506 to the test line 507, a circuit is completed for relay SV(10) and that relay should operate and remain operated during the ringing tests. The operation of relay SV(10) operates relay A(9) and extinguishes lamp SV(1). Relay A(9), in operating, starts the operation of the ringing timer 1100.

Relay SPA(4) was operated when relay TG0(11) operated and, therefore, the operation of relay A(9) now operates relay SPB(8), which in turn operates relay SPC(8). With relay SPB(8) operated, the trunk conductors, previously traced to the windings of relay BXA(4), are connected in simplex to ground through the winding of relay SP(8). This circuit tests the pad control function of the trunk and, if battery is present at the trunk circuit, relay SP(8) operates in turn operating relay SP1(4). Relay SPC(8), when operated, opens the circuit of relay SPA(4) and relays SPA(4), SPB(8) and SPC(8) release slowly. During this interval a test is made for false ground on the pad control circuit, under which condition relay SP(8) operates following the release of relay SPB(8) and prevents the release of relay SPC(8). Relay SPC(8) operates relay AL1(12) and, if relay SPC(8) does not release, relay AL1(12) is also held operated. If there is no battery on the pad control circuit so that relays SP(8) and SP1(4) do not operate, lamp NPB(1) is lighted, whereas, if relay SP(8) fails to operate on the first test but is operated on the second test, following the release of relay SPB(4), lamp GPC(1) is lighted.

Figure 4:
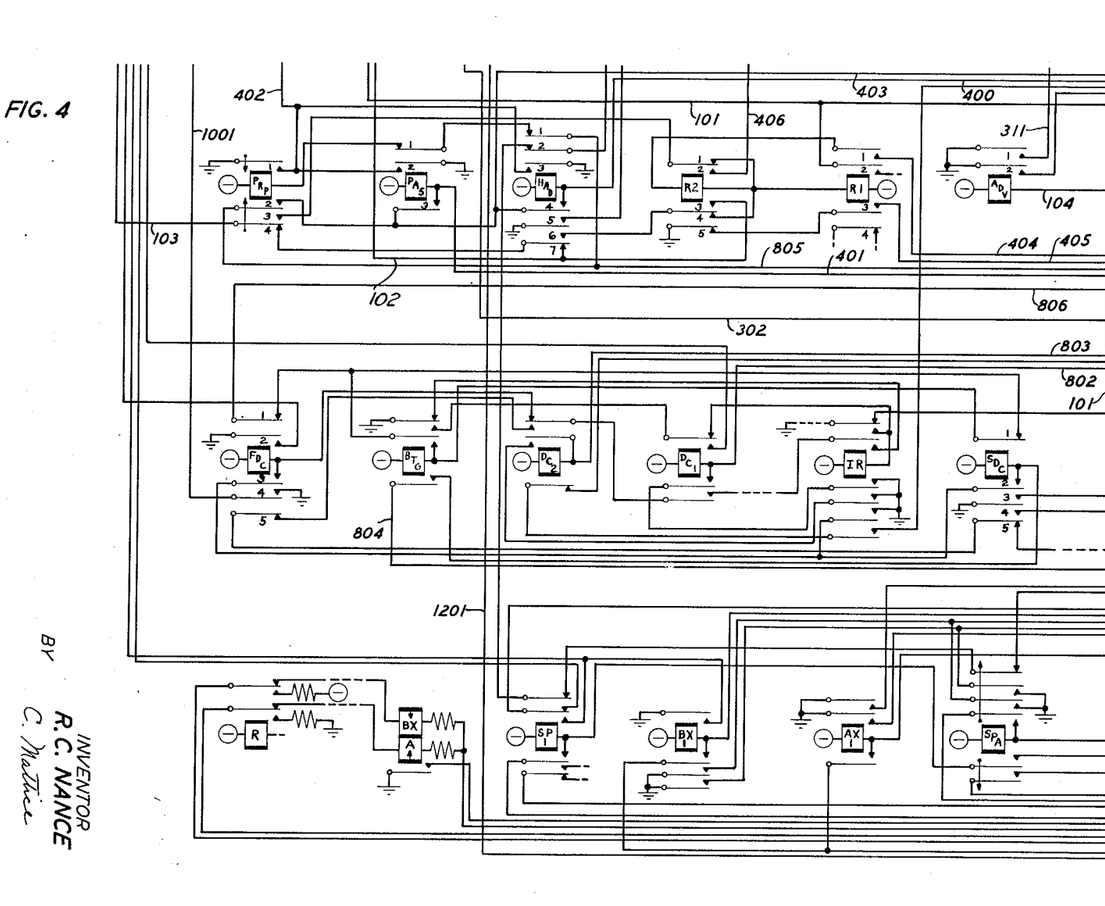
Fig. 4 shows a part of the test circuit including the class of failure relays.

Relay BXA(4) is differentially wound and if either of the pad control conductors is open or crossed to battery so as to upset the balance of the simplex circuit, relay BXA(4) operates and, while relay SPC(8) is operated, in turn operates relay BX1(4). With relay BX1(4) operated, lamp XPC(1) is lighted. Relay AX(8), which is included in the circuit of relay SV(10) is also differentially wound and, if this circuit is unbalanced, relay AX(8) operates and, during the time that relay SPC(8) is operated, operates relay AX1(4) which lights lamp XSP(1).

If the above tests indicate a satisfactory condition of the trunk, relay AL1(12) is permitted to release and, when relay MV(12) is operated at the end of the first period measured by the timing circuit 1100, relay R(4) is operated to connect battery and ground to the pad control conductors as a ringing signal. Relay MV(12) also operates relays M1(12) and MA(9).

After a further measured interval, relay MV(12) releases, operating relay M2(12) which operates relay AL1(12). The release of relay MV(12) also opens the circuit of relay R(4) to terminate the ringing signal. When the trunk circuit has transmitted the outgoing ringing signal to the test line 507 it releases relay SV(10) which operates relay B(9) and releases relay AL1(12). If the trunk circuit fails to release relay SV(10), relay B(9) is not operated and relay AL1(12) is held operated. On the other hand, if a premature flashing is received so that relay SV(10) reoperates before relay MV(12) reoperates, relay C(9) is operated, followed by relay AL1(12).

Figure 9:
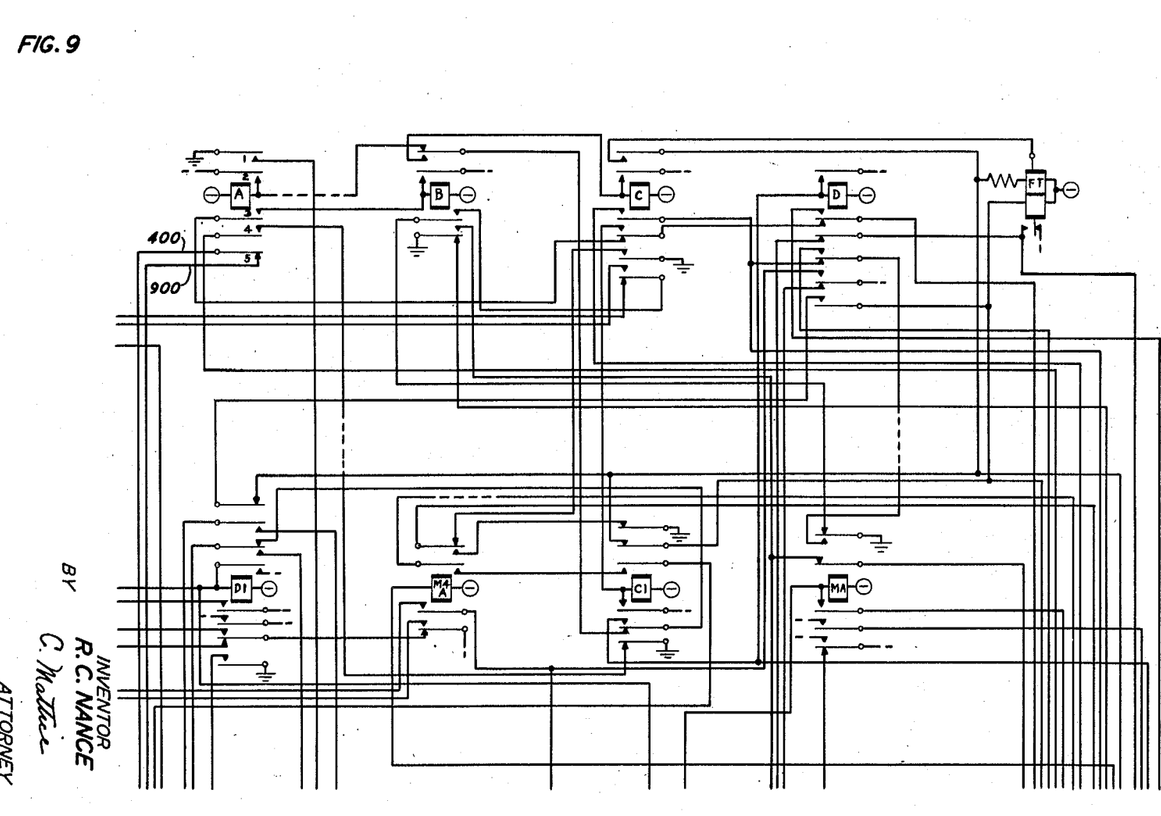
Figs. 9 and 10 show relays for testing the ability of the trunk circuit to respond to ringing current and to transmit flashing signals.

At the end of the next time interval, relay MV(12) reoperates and if the first ringing signal has been properly handled, the second ringing signal is transmitted. With relay AL1(12) released, the reoperation of relay MV(12) operates relay M3(12). When relay MV(12) releases at the end of the next interval to terminate the second ringing signal, relays M4(12) and M4A(9) are operated, relay M4A(9) reoperating relay AL1(12).

The test line is arranged to respond to the second ringing signal by transmitting ground pulses at 120 impulses per minute over the supervisory simplex, operating relay SV(10) at a corresponding rate. In response to the repeated operation and release of relay SV(10) relays C(9), C1(9), D(9), D1(9), E(10) and F(10) are operated to count three complete flashes. The second off-hook signal is timed by relay FS1(10) and the third off-hook signal is timed by relay FS2(10).

The operation of relay C1(9) marks the end of the ringing test, stops the operation of the ringing timer 1100 and starts a timing operation by means of the pulsing and timing circuit 800 for timing the supervisory tests. If at the end of the timing operation measured by circuit 800, relays FS1(10), FS2(10) and F(10) have operated to indicate that the flashing signals have been of the proper duration and the proper number has been received in the measured time interval, relay STF(8) operates, in turn operating relay V(11). Relay V(11) restores the timer 800 and thereby releases relay STF(8).

During the ringing and supervisory tests relay ALM(11) may be operated under a variety of conditions and lamps will be lighted to indicate the reason for the operation of relay ALM(11). If relay B(9) operates prematurely, lamp HIT(1) is lighted; if relay C(9) operates prematurely, lamp CHT(1) is lighted; if relay F(10) fails to operate, lamp SFL(1) is lighted; if relay FS1(10) fails to operate, lamp FS1(1) is lighted; if relay FS2(10) fails to operate, lamp FS2(1) is lighted; if the test is stopped during the first ringing period, lamp R1(1) is lighted and if it is stopped during the second ringing period, lamp R2(1) is lighted. Relay ALM(11), if operated as described hereinafter, also lights lamp DAR(1).

Relay V(11) also initiates the release test by operating relay DTC(8). When relay SLC(7) operates and relay SLO(7) releases following the supervisory test, the busy test conductor 505 which extends as previously traced to conductor 1202, is further extended over a back contact of relay SLO(7), front contact of relay SLC(7), to conductor 706. With relay DTC(8) operated, the busy test conductor of the trunk is extended from conductor 706, over a front contact of relay DTC(8), conductor 806, back contact of relay FDC(4), back contact of relay SDC(4), to the winding of relay BTG(4) and relay BTG(4) operates, locking over the back contact of relay FDC(4) to conductor 806 independent of relay SDC(4). Relay BTG(4) in turn operates relay IR(4). Relay IR(4) disconnects ground from the sleeve conductor of the link switches 501, thereby releasing the switches and disconnecting the trunk from the test circuit. The removal of ground from the sleeve conductor initiates a timing operation in the trunk circuit during which the trunk circuit should maintain the busy indication on the busy test conductor.

Relay IR(4) initiates the operation of the timing circuit 800 to measure a time interval during which the busy indication should be maintained. During the operation of the timing circuit 800, with relay DTC(8) operated, ground is connected at predetermined intervals to conductors 802, 803 and 804. Ground on conductor 802 operates relay DC1(4), ground on conductor 803 operates relay DC2(4) and ground on conductor 804, if relay BTG(4) is still operated, operates relay SDC(4). If relay BTG(4) releases following the operation of relay DC1(4), but prior to the operation of relay DC2(4), relay FDC(4) operates, disconnecting relay BTG(4) from the busy test conductor and lighting lamp FDC(1) to indicate a fast disconnect. If relay BTG(4) releases, following the operation of relay DC2(4), but prior to the operation of relay SDC(4), the disconnect timing is satisfactory and the test will proceed. If relay BTG(4) releases, following the operation of relay SDC(4), lamp SDC(1) is lighted to indicate a slow disconnect and if relay BTG(4) remains operated until the trouble timing circuit 1000 operates, lamp NDC(1) is lighted to indicate a failure of the trunk to release. Relays FDC(4) or SDC(4), if operated, block the test and cause an alarm to be sounded.

The release of relay BTG(4) at the proper time operates the completed test register CT(11), in turn operating relay CA(12) to advance the test connector to the next trunk in the manner fully described in the Shoffstall patent.

*Class of trouble indication*

As previously stated, whenever a test failure occurs, a class-of-trouble relay is operated. Three class-of-trouble relays are provided, that is relays PRP(4), PAS(4) and HAD(4).

Relay HAD(4) operates only if a test failure occurs between the operation of relay STC(8) to initiate the ringing and supervisory tests and the operation of relay A(11) to indicate that the trunk has been connected to the test line. The operation of relay HAD(4) indicates that the test call was left "high and dry." The circuit for operating relay HAD(4) may be traced from battery through the winding of relay HAD(4), conductor 400, contact 5 of relay A(9), conductor 900, contact 1 of relay STC(8) to conductor 805. Conductor 805 is grounded under a number of different circumstances but at this time is grounded over contact 1 of relay TB(10), conductor 1001, contact 4 of relay F(10), conductor 1002, contact 4 of relay STC(8) and the timing circuit 800. Relay HAD(4), if operated, locks over its contact 4, conductor 403 to ground at contact 3 of relay TB(10).

Relay PAS(4) operates if, after the marker has completed the connection between the test line and the trunk, the circuit by which the trunk circuit is held from the test circuit is not properly closed so that the trunk does not maintain ground on the busy test conductor. As previously described, when the marker signals for release by operating relay RL(10), relay BT(12) is again connected to the busy test conductor and with relay BT(12) held operated, relay ST1(7) is operated to control the initiation of the ringing and supervisory tests. If relay BT(12) fails to hold, relay ST1(7) cannot operate and a circuit is closed from battery through the winding of relay PAS(4), conductor 401, contact 3 of relay RL(10), conductor 1003, contact 8 of relay ST1(7) to conductor 805. At this time, conductor 805 is grounded under the control of the timing circuit 1000. Relay PAS(4) locks over its contact 3 and conductor 403 to ground at contact 3 of relay TB(10). A failure at this time may be due to trouble in the test circuit itself or in the test wiring.

Relay PRP(4) operates for any trouble other than those specifically indicated by relays PAS(4) and HAD(4). The circuit of this relay extends from battery through the winding of the relay, contact 1 of relay PAS(4), contact 1 of relay HAD(4) to conductor 805. Relay PRP(4) is somewhat slow to operate so that for a condition which would cause either relay PAS(4) or relay HAD(4) to operate the circuit of relay PRP(4) is opened before theat relay can operate. Since conductor 805 may be grounded directly under control of the timing circuit 1000, relay PRP(4) also operates in the case of a prolonged busy condition of the selected trunk if the recorder is not functioning. Relay PRP(4) locks over contact 1 of relay PAS(4), contact 1 of relay HAD(4), contact 2 of relay PRP(4), conductor 403 to ground at contact 3 of relay TB(10) or contact 3 of relay B(10).

It may be noted that in addition to being grounded under the control of timing circuit 1000, conductor 805 may be grounded in response to certain specific test failures. For example, if relay FDC(4) operates because the trunk disconnects too quickly, conductor 805 is grounded over contact 1 of relay TB(10), conductor 1001 and contact 4 of relay FDC(4). Similarly, if the trunk disconnects too slowly and relay SDC(4) operates, conductor 805 is grounded over contact 1 of relay TB(10), conductor 1001 and contact 3 of relay SDC(4). Conductor 1001 is also grounded over contact 1 of relay PSL(11) and grounded conductor 1101 or over contact 6 of relay PFL(11) and grounded conductor 1101. Furthermore, ground supplied to conductor 1002 from timer 800 over contact 4 of relay STC(8), in addition to being extended to conductor 1001 over contact 4 of relay F(10), as previously traced, may be extended to conductor 1001 over contact 3 of relay F(10) and contact 2 of relay FS2(10) or over contact 3 of relay F(10), contact 3 of relay FS2(10) and contact 4 of relay FS1(10). Circuits for grounding conductor 1001 as a result of other test failures may be found in the disclosure of the Shoffstall patent.

*Trouble recording and automatic repeat—general*

The operation of the test circuit following the operation of the relays PRP(4), PAS(4) or HAD(4) depends on whether or not the printer key PTR(1) is operated, and whether automatic repeat key 100 is normal or thrown to its AR position or its AAR position. The purpose of key PTR(1) is to cause the automatic recording of test failures by means of the automatic teletypewriter recorder or printer. Key 100 is a three-position key which is normal in its central position. When thrown to the AR position it arranges the test circuit to make automatically controlled repeat tests on trunks which encounter operational failure, for the purpose of verifying the condition and to cause the test frame to block and operate an alarm if the trouble condition persists. When key 100 is thrown to the AAR position and the teletypewriter recorder is functioning, the automatically controlled repeat tests are made as with the key in the AR position but, in addition, the test circuit may be advanced to the next trunk circuit after the printer has completed a second trouble record.

When any of the relays PRP(4), PAS(4) and HAD(4) operate, ground is connected to conductor 402, completing a circuit through the winding of relay ALM(11) to battery. Relay ALM(11) operates in this circuit, grounding conductor 1001 and other conductors to hold the test circuit relays. In addition, if key PTR(1) is not operated and key 100 is in its normal position, it closes a circuit from battery through the winding of relay AL(11), conductor 606, contact 4 of relay ALM(11), conductor 1102, contact 2 of key PTR (1), contacts 2 and 6 of key 100, contact 5 of key PTR(1) to ground on conductor 402. Relay AL(11) operates in this circuit and sounds an alarm.

*Trouble recording—trunk busy*

If the trouble recorder is to be used, key PTR(1) will be operated before the test is started. With key PTR(1) operated, a circuit is closed from ground over contact 6 of key PTR(1), conductor 101 to battery through the winding of relay PTR(3) in the recorder circuit. Relay PTR(3) connects resistance battery over conductor 300 and ground over conductor 301 to the teletypewriter machine 607 to start its operation.

When the test circuit starts the test of a trunk, relay PB(12) is operated from off-normal ground on conductor 1200, in turn operating a cascade of slow-to-release relays indicated by relay PB3(12). When relay BT1(12) operates to make the test of the busy test conductor, as previously described, it opens the circuit of relay PB(12) and the cascade of relays including relay PB3(12) starts to release. If the trunk is idle, relay BT(12) releases, in turn operating relay CS(11) and relay CS(11) closes a holding circuit for relay PB3(12). If the trunk is busy, relay PB3(12) releases and a circuit is closed from ground on conductor 101, back contact of relay PB3(12), conductor 1201 to battery through the winding of relay BY(3) in the trouble recorder. Relay BY(3) initiates the recording of the identity of the busy trunk and connects ground over conductor 302 to battery through the winding of relay CTA(12) to prevent that relay from releasing and permitting the test circuit to advance while the record is being made. Means is provided, but not shown, in the circuit of relay BY(3) by which the time elapsing between the operation of relay BT1(12) and the operation of the recorder may be varied as desired.

Assuming that relay BY(3) is operated, a circuit is closed from ground over contact 3 of relay BY(3), contact 2 of relay RC(3), conductor 303, contact 4 of relay W13(7), contacts 3 of relays W12(7), W11(7) and W10(7), contact 4 of relay W9(7), contact 3 of relay W8(7), conductor 700, contacts 3 of relays W7(3) to W2(3) to battery through the winding of relay W1(3).

Relay W1(3) operates in this circuit and closes the circuit for code relay CR(2) which may be traced from battery through the winding of relay CR(2), conductor 200, contact 2 of relay W1(3), contact 1 of relay W2(3), conductor 304, contact 5 of relay RC1(3), contact 5 of relay RC(3) to ground at contact 2 of relay BY(3). Relay CR(2) applies the proper code to the teletypewriter distributor for a carriage return signal and causes the distributor to make a revolution. When the distributor starts, ground on conductor 601 operates relay WR(6) over contact 3 of relay WA(6). Relay WR(6) operates and locks over its contact 2, conductor 602, front contact of relay CR(2), conductor 201 to ground at contact 1 of relay BY(3).

At the end of the revolution, ground is connected to conductor 603 operating relay WA(6). With relays WA(6) and WR(6) operated, a circuit is closed from ground on the operating circuit of relay W1(3), contact 3 of relay W1(3), conductor 305, contacts 1 of relays WA(6) and WR(6), conductor 604, contact 5 of relay W1(3) to battery through the winding of relay W2(3). Relay W2(3) operates in this circuit and locks over its contact 4, contact 3 of relay W3(3) and thence as traced for the operating circuit of W1(3) to ground at contact 3 of relay BY(3). At its contact 3, relay W2(3) opens the operating circuit of relay W1(3) but relay W1(3) is held operated over the operating circuit for relay W2(3). Relay W2(3) opens the circuit of relay CR(2) and that relay releases, in turn releasing relay WR(7). The release of WR(7) opens the operating circuit for relay W2(3) and the holding circuit for relay W1(3) so that relay W1(3) now releases.

With relay W1(3) released and relay W2(3) operated, a circuit is closed for code relay LF(2) which may be traced from ground on conductor 304, contact 1 of relay W1(3), contact 1 of relay W3(3), contact 2 of relay W2(3), conductor 306 to battery through the winding of code relay LF(2). Code relay LF(2) causes the teletypewriter to operate the line feed mechanism.

At the start of the second revolution, relay WA(6) is released and relay WR(6) operated and at the end of the revolution relay WA(6) is reoperated to operate relay W3(3). Relay W3(3) releases code relay LF(2) which in turn releases relay WR(6) and W2(3). With relay W2(3) released, the next code relay, namely relay FS(2) is operated to set the teletypewriter to print figures.

The operation of relays W4(2) to W9(7) takes place as described for relays W2(3) and W2(3).

With relay W4(3) operated, relay TH(5) is operated, connecting lamps TH0(1) to TH9(1) to code relays 0(6) to 9(6). The ground used for lighting one of these lamps will now operate the corresponding one of the code relays, resulting in the printing of the corresponding thousands digit by the teletypewriter.

Similarly, relay W5(3) operates relay HU(5) to connect lamps H0(1) to H9(1) to the code relays to print the hundreds digit. Relay W6(3) operates relay TN(5) to control printing the tens digit and relay W7(3) operates relay U(5) to control printing the units digit of the trunk number. With relay W8(7) operated, code relay SP(2) is operated to cause the teletypewriter to skip a space.

With relay W9(7) operated a circuit is closed from ground over contact 2 of relay BY(3), contact 5 of relay RC(3) and contact 5 of relay RC1(3), conductor 304, contacts 1 of relays W2(3), W4(3), W6(3), conductor 307, contacts 1 of relays W8(7), W10(7) and W13(7), contact 2 of relay W9(7), conductor 701, contact 3 of relay T(3), conductor 308, to battery through the winding of code relay LS(2) to cause the teletypewriter to adjust for printing letters.

When relay WA(6) operates, following the transmission of the letter shift code, a circuit is closed as previously traced from ground to conductor 604 and thence over contact 6 of relay W1(3), contacts 8 of relays W2(3) to W9(7), conductor 702, contact 11 of relay T(3), conductor 309 to battery through the winding of relay W13(7). The signals controlled by relays W10(7) to relay W12(7) are used by the transmission test circuit and will not be described.

Relay W13(7) operates in the above-traced circuit and, since relay BY(3) is operated, a circuit is closed as above traced from ground at contact 2 of relay BY(3) to contact 1 of relay W10(7) and thence over contact 1 of relay W12(7), contact 9 of relay W13(7), contact 3 of relay W9(7), conductor 703, contact 8 of relay T(3), contact 5 of relay BY(3), conductor 310, to battery through the winding of code relay B(2) whereby the letter B is printed by the teletypewriter to indicate that a busy trunk is being recorded.

When relay WA(6) operates, following the transmission of the letter B, a record-finished signal is transmitted to the test circuit by closing a circuit from ground at contact 3 of relay BY(3), contact 2 of relay RC(3), conductor 303, contact 3 of relay W13(7), contacts 6 of relays W12(7), W11(7) and W10(7), contact 7 of relay W9(7), contacts 6 of relays W8(7) to W2(3), contact 4 of relay W1(3), conductor 305, contact 1 of relay WA(6), contact 1 of relay WR(6), conductor 604, contact 6 of relay W1(3), contacts 8 of relays W2(3) to W8(7), contact 9 of relay W9(7), contacts 8 of relays W10(7) to W12(7), contact 7 of relay W13(7), conductor 704, contact 5 of relay T(3), contact 4 of relay BY(3), conductor 311 to battery through the winding of relay CAK(12) in the test circuit. Relay CAK(12) operates relay CA(12). Relay CA(12) causes the test circuit to advance to the next trunk in the manner described in the Shoffstall patent. The advance of the test circuit opens the circuit of relay BY(3) in the teletypewriter circuit, restoring that circuit to normal.

*Trouble recording—test failure*

In a case of an operational failure, whereby one of the relays PRP(4), PAS(4) or HAD(4) is operated, the connection of ground to conductor 402 completes a circuit over contact 2 of relay TB1(3), contact 1 of relay PTR(3) to battery through the winding of relay TB(3) operating the latter relay. Relay TB(3) prepares the recorder to record a test failure. Relay TB(3) at its contact 3 connects ground over contact 2 of relay RC(3) to conductor 303 completing the previously traced circuit for relay W1(3). The transmission of the carriage return, line feed and figure shift signals followed by the printing of the trunk number and the letter shift signal take place as previously described, at the end of which relay W13(7) is operated. With relay TB(3) operated, the operation of relay W13(7) completes a circuit from ground over contact 4 of relay TB(3), contact 5 of relay RC(3), contact 5 of relay RC1(3), conductor 304, contacts 1 of relays W2(3), W4(3), W6(3), W8(7), W10(7), W12(7), contact 9 of relay W13(7), contact 3 of relay W9(7), conductor 703, contact 8 of relay T(3), contact 8 of relay TB(3), conductor 312 to battery through the winding of relay XC(2). Relay XC(2) operates in this circuit and connects multiples of the lamp circuits through to the code relays.

In order to simplify the recording, indications relating to the same test category have been grouped and the corresponding indicating leads connected in multiple to a code relay. In most cases of trouble, one of the indicating leads from the test circuit will be grounded to cause the associated code relay to operate and cause the teletypewriter to print a letter representative of the trouble category.

However, there are certain trouble conditions which may result in an alarm condition when none of the indicating leads are grounded. Relay XC(2) operates relay PX(2) which closes a circuit over a contact of relay XC(2) and over the back contacts of all of the other letter code relays for operating the code relay for the letter X to cause the teletypewriter to print that letter. Relay PX(2) is made slow to operate so that the circuit for the X code relay will be opened if any other letter code relay operates.

The following is a table illustrating the relationship between the trouble lamps lighted, the general trouble category to which they belong and the representative character printed by the teletypewriter.

| Test Lamp Lighted | General Trouble Category | Character |
| --- | --- | --- |
| COF, MKT | Common Control | Q |
| HIT, CHT, XSP | Supervision | E |
| MSC, ASX, BSX | Continuity | W |
| R1, R2 | Ringing | R |
| FDC, SDC, NDC | Disconnect | D |
| SFL, PFL, FS1, FS2 | Flashing | I |
| OS, MS | Ground | G |
| NPB, GPC, XPC | Pad Control | P |
| PSL, SLO | SL Check | L |
| DDL | Steady Stop | O |
| HAD | High and Dry | A |
| TB | Busy | B |
| No Class | No Class | X |

The recorder is also used for recording the results of transmission tests, for which purpose relay T(3) is operated under the control of the automatic transmission test and control circuit 600.

Since for recording the results obtained by the transmission test circuit 600, crosses between the leads for operating the numerical code relays might introduce serious errors, means has been included in the recorder for detecting such crosses. The battery for operating the numerical code relays 0(2) to 9(2) is fed through the lower winding of XCR(6). Relay XCR(6) is marginal so that it does not operate in series with a single code relay but, in the case of a cross which would operate more than one of the numerical code relays, relay XCR(6) operates, locking through its upper winding over the front contacts of the operated code relays. Relay XCR(6), in operating, extends its locking ground over conductor 605 to lamp XCR(1), and connects ground over its contact 2 and contact 2 of relay WA(6) in shunt of the winding of relay WA(6) to prevent the operation of that relay and thereby to stop the teletypewriter. In addition, it connects ground over its contact 3 and conductor 606 to battery through the winding of relay AL(11) to cause an alarm to be sounded.

When a trouble record has been completed, the record-finished signal circuit may be traced from ground over contact 3 of relay TB(3), contact 2 of relay RC(3) to conductor 303 and thence as previously traced to conductor 704, contact 5 of relay T(3), contact 5 of relay TB(3) to conductor 313.

If key 100 is in its normal position, the ground on conductor 313 is extended over contacts 6 and 2 of key 100, conductor 102, contact 3 of relay PTR(3) to battery through the winding of relay TB1(3). Relay TB1(3) operates in this circuit, locks to the ground on conductor 402, opens the operating circuit for relay TB(3) and connects ground over its contact 1, conductor 314, contact 1 of key PTR(1), conductor 1102, contact 4 of relay ALM(11), to battery through the winding of relay AL(11) to cause an alarm to be sounded.

*Automatic repeat tests*

As previously stated, key 100 determines whether or not a repeat test is to be made of the same trunk on which the test circuit finds an operational failure. A repeat test may be made, whether or not the teletypewriter is working, following an operational failure which causes the operation of relay PRP(4) or one which causes the operation of relay HAD(4) but not for a failure which causes the operation of relay PAS(4). With key 100 thrown to either operative position, key PTR(1) normal and relay PRP(4) operated, relay R1(4) is operated in a circuit extending from battery through the winding of relay R1(4), contact 1 of relay R2(4), contact 3 of relay PRP(4), conductor 103, either over contacts 1 and 6 of key 100 or over contact 5 of key 100, contact 5 of key PTR(1), conductor 402 to ground at contact 1 of relay PRP(4).

If relay HAD(4) is operated, the circuit for relay R1(4) extends from battery through the winding of relay R1(4), contact 4 of relay R2(4), contact 6 of relay HAD(4) and contact 4 of relay PRP(4) to conductor 103 and thence as above traced to conductor 402 and ground at contact 3 of relay HAD(4).

Relay R1(4) operates in either of these circuits and locks in a circuit from battery through the winding of relay R1(4), winding of relay R2(4), contact 1 of relay R1(4), conductor 404 to ground at contact 8 of relay CA(12). Relay R2(4) cannot operate in this locking circuit, being shunted by the operating circuit of relay R1(4). With relay R1(4) operated, a circuit is closed from ground over contact 5 of relay R2(4), contact 3 of relay R1(4), conductor 405 to battery through the lower winding of relay CA1(12) to cause the test circuit to release and to start a repeat test on the same trunk, as described in the Shoffstall patent. The release of the test circuit causes failure class relay PRP(4) or HAD(4) to release, opening the circuit for relay R1(4) and permitting relay R2(4) to operate.

If no operational failure is found on the repeat test, the test circuit advances to the next trunk in the usual manner. If any of the failure class relays PRP(4), HAD(4) or PAS(4) operates as a result of the repeat test, ground connected to conductor 402 extends as previously traced to conductor 103. With relay PRP(4) operated, conductor 103 is extended over contact 3 of relay PRP(4), contact 2 of relay R2(4), conductor 406, either over contact 3 of key 100 and contact 2 of key PTR(1) or over contact 4 of key 100 and contacts 4 and 2 of key PTR(1), conductor 1102, contact 4 of relay ALM(11) to battery through the winding of relay AL(11) to cause an alarm to be sounded.

If relay HAD(4) is operated, ground on conductor 103 is extended over contact 4 of relay PRP(4), contact 6 of relay HAD(4), contact 3 of relay R2(4), conductor 102, contact 2 of key PTR(1) to conductor 1102 and thence as above traced to the winding of relay AL(11).

If relay PAS(4) is operated, either on the first test or following a repeat test resulting from the operation of relay PRP(4) or relay HAD(4), it connects ground to conductor 402 which is extended as above traced, with key 100 operated to either repeat test position, to conductor 103 and thence over contact 4 of relay PRP(4), contact 7 of relay HAD(4) to conductor 102 to operate relay AL(11).

*Record and repeat*

If the teletypewriter recorder is functioning, the repeat test is initiated by the record-completed signal consisting of the connection of ground to conductor 313. With key 100 thrown to either operated position, ground on conductor 313 is extended either over contact 5 of key 100 or over contacts 6 and 1 of key 100 to conductor 103 and thence as above traced to the winding of relay R1(4), relay R1(4), locking through the winding of relay R2(4) and initiating the repeat test as above described. If the repeat test meets with no functional failures, the test circuit advances to the next trunk, releasing relays R1(4) and R2(4).

With the teletypewriter recorder functioning, the response to a functional failure on the repeat test differs according to the position of key 100. As above described, the record-finish signal consisting of the connection of ground to conductor 313 causes the extension of ground to conductor 103. With relay PRP(4) operated, ground on conductor 103 is extended over contact 3 of relay PRP(4), contact 2 of relay R2(4) to conductor 406. With key 100 in its AR position this circuit continues over contact 3 of key 100, conductor 102, contact 3 of relay PTR(3) to battery through the winding of relay TB1(3). Relay TB1(3) releases relay TB(3) to restore the recorder to normal and connects ground over conductor 314, contact 1 of key PTR(1) to conductor 1102 to operate relay AL(13). If relay HAD(4) is operated, ground on conductor 103 is connected over contact 4 of relay PRP(4), contact 6 of relay HAD(4), contact 3 of relay R2(4) to conductor 102. If relay PAS(4) is operated, ground on conductor 103 is connected over contact 4 of relay PRP(4), contact 7 of relay HAD(4) to conductor 102 to operate relay TB1(3) as above described.

If key 100 is thrown to its AAR position, ground on conductor 313, following the repeat test, is extended to conductor 103 as above and with relay PAS(4) or with relay HAD(4) operated is extended as above to conductor 102 to operate relay TB1(3) to sound an alarm. However, with relay PRP(4) operated, ground on conductor 103 completes a circuit over contact 3 of relay PRP(4), contact 2 of relay R2(4), conductor 406, contact 4 of key 100, contact 3 of key PTR(1), conductor 104, to battery through the winding of relay ADV(4). Relay ADV(4), at its contact 1, connects ground to conductor 311 completing the circuit previously traced for relay CAK(12). Relay CAK(12) in turn operates relay CA(12) and causes the test circuit to advance to the next trunk. Relay CAK(12) is also operable under the control of key CA(1) to advance the test circuit to the next trunk under manual control.

From the foregoing it will be apparent that there are three classes of operational failures. For one class the test is always blocked and an alarm sounded. For a second class, the test may be repeated but the test is always blocked on a similar operational failure of the repeat test, while for the third class the test may not only be repeated but the test circuit may be advanced to the next trunk if the same class of failure appears on the repeat test.

What is claimed is:

1. A routine testing circuit for testing a plurality of pieces of automatic telephone equipment, means in said testing circuit to connect with said pieces of equipment in succession, means responsive to the connection of said testing circuit with one of said pieces of equipment to make a plurality of tests of the connected piece of equipment, means in said testing circuit responsive to the correct operation of said piece of equipment in response to said plurality of tests to cause said connecting means to connect said test circuit with another piece of equipment, class of trouble indicating means in said testing circuit, means responsive to the faulty operation of said piece of equipment in response to one of said plurality of tests for operating one of said indicating means, and means under the selective control of said indicating means to cause said testing circuit to repeat said plurality of tests on said one piece of equipment.

2. A routine testing circuit for testing a plurality of pieces of automatic telephone equipment, means in said testing circuit to connect with said pieces of equipment in succession, means responsive to the connection of said testing circuit with one of said pieces of equipment to make a plurality of tests of said connected piece of equipment, means in said testing circuit responsive to the correct operation of said piece of equipment in response to said plurality of tests to cause said connecting means to connect said test circuit with another piece of equipment, class of trouble indicating means in said testing circuit, means responsive to the faulty operation of said piece of equipment in response to one of said plurality of tests for operating one of said indicating means, means normally under the control of said indicating means to operate an alarm, and means to render certain of said indicating means effective to cause said testing circuit to repeat said plurality of tests on said one piece of equipment.

3. A routine testing circuit for testing a plurality of pieces of automatic telephone equipment, means in said testing circuit to connect with said pieces of equipment in succession, means responsive to the connection of said testing circuit with one of said pieces of equipment to make a plurality of tests of said connected piece of equipment, means in said testing circuit responsive to the correct operation of said piece of equipment in response to said plurality of tests to cause said connecting means to connect said test circuit with another piece of equipment, class of trouble indicating means in said testing circuit, means responsive to the faulty operation of said piece of equipment in response to one of said plurality of tests for operating one of said indicating means, means normally under the control of said indicating means to operate an alarm, and manually controlled means to render certain of said indicating means effective to cause said testing circuit to repeat said plurality of tests on said one piece of equipment.

4. A routine testing circuit for testing a plurality of pieces of automatic telephone equipment, means in said testing circuit to connect with said pieces of equipment in succession, means responsive to the connection of said testing circuit with one of said pieces of equipment to make a plurality of tests of said connected piece of equipment, means in said testing circuit responsive to the correct operation of said piece of equipment in response to said plurality of tests to cause said connecting means to connect said test circuit with another piece of equipment, class of trouble indicating means in said testing circuit, means responsive to the faulty operation of said piece of equipment in response to one of said plurality of tests for operating one of said indicating means, a recording device, means under the control of any one of said indicating means to operate said recording device, and means responsive to the operation of said recording device and under the selective control of said indicating means to cause said testing circuit to repeat said plurality of tests on said one piece of equipment.

5. A routine testing circuit for testing a plurality of pieces of automatic telephone equipment, means in said testing circuit to connect with said pieces of equipment in succession, means responsive to the connection of said testing circuit with one of said pieces of equipment to make a plurality of tests of said connected piece of equipment, means in said testing circuit responsive to the correct operation of said piece of equipment in response to said plurality of tests to cause said connecting means to connect said test circuit with another piece of equipment, class of trouble indicating means in said testing circuit, means responsive to the faulty operation of said piece of equipment in response to one of said plurality of tests for operating one of said indicating means, a recording device, means under the control of any one of said indicating means to operate said recording device, means normally responsive to the operation of said recording device to cause said test circuit to operate an alarm, and means under the control of certain of said indicating means responsive to the operation of said recording means to cause said test circuit to repeat said plurality of tests on the said one piece of equipment.

6. A routine testing circuit for testing a plurality of pieces of automatic telephone equipment, means in said testing circuit to connect with said pieces of equipment in succession, means responsive to the connection of said testing circuit with one of said pieces of equipment to make a plurality of tests of said connected piece of equipment, means in said testing circuit responsive to the correct operation of said piece of equipment in response to said plurality of tests to cause said connecting means to connect said test circuit with another piece of equipment, class of trouble indicating means in said testing circuit, means responsive to the faulty operation of said piece of equipment in response to one of said plurality of tests for operating one of said indicating means, a recording device, means under the control of any one of said indicating means to operate said recording device, means responsive to the operation of said recording device to transmit a record-finished signal to said test circuit, first means in said test circuit to operate an alarm, other means in said test circuit to cause said test circuit to repeat said plurality of tests on said one piece of equipment, and means under the selective control of said indicating means to cause said record-finished signal to operate either said first means or said other means.

7. A routine testing circuit for testing a plurality of pieces of automatic telephone equipment, means in said testing circuit to connect with said pieces of equipment in succession, means responsive to the connection of said testing circuit with one of said pieces of equipment to make a plurality of tests of said connected piece of equipment, means in said testing circuit responsive to the correct operation of said piece of equipment in response to said plurality of tests to cause said connecting means to connect said test circuit with another piece of equipment, class of trouble indicating means in said testing circuit, means responsive to the faulty operation of said piece of equipment in response to one of said plurality of tests for operating one of said indicating means, a recording device, means under the control of any one of said indicating means to operate said recording device, means responsive to the operation of said recording device to transmit a record-finished signal to said test circuit, first means in said test circuit to operate an alarm, other means in said test circuit to cause said test circuit to repeat said plurality of tests on said one piece of equipment, and manually controlled means to render said indicating means selectively effective to cause said record-finished signal to operate either said first means or said other means.

8. A routine testing circuit for testing a plurality of pieces of automatic telephone equipment, means in said testing circuit to connect with said pieces of equipment in succession, means responsive to the connection of said testing circuit with one of said pieces of equipment to make a plurality of tests of said connected piece of equipment, means in said testing circuit responsive to the correct operation of said piece of equipment in response to said plurality of tests to cause said connecting means to connect said test circuit with another piece of equipment, class of trouble indicating means in said testing circuit, means responsive to the faulty operation of said piece of equipment in response to one of said plurality of tests for operating one of said indicating means, a recording device, means under the control of any one of said indicating means to operate said recording device, means responsive to the operation of said recording device to transmit a record-finished signal to said test circuit, first means in said test circuit to operate an alarm, other means in said test circuit to cause said test circuit to repeat said plurality of tests on said one piece of equipment, means normally responsive to said record-finished signal to operate said first means, and manually controlled means to render certain of said indicating means effective to cause said record-finished signal to operate said other means.

9. A routine testing circuit for testing a plurality of pieces of automatic telephone equipment, means in said testing circuit to connect with said pieces of equipment in succession, means responsive to the connection of said testing circuit with one of said pieces of equipment to make a plurality of tests of said connected piece of equipment, means in said testing circuit responsive to the correct operation of said piece of equipment in response to said plurality of tests to cause said connecting means to connect said test circuit with another piece of equipment, class of trouble indicating means in said testing circuit, means responsive to the faulty operation of said piece of equipment in response to one of said plurality of tests for operating one of said indicating means, a recording device, means under the control of any one of said indicating means to operate said recording device, means responsive to the operation of said recording device and under the selective control of said indicating means to cause said testing circuit to repeat said plurality of tests on said one piece of equipment, means responsive to the operation of certain of said indicating means during said repeat tests to operate said recording device a second time, an alarm, means normally responsive to said second operation of said recording device to operate said alarm, and means for causing said second operation of said recording device to operate said connecting means to connect said testing circuit with another piece of equipment.

10. A routine testing circuit for testing a plurality of pieces of automatic telephone equipment, means in said testing circuit to connect with said pieces of equipment in succession, means responsive to the connection of said testing circuit with one of said pieces of equipment to make a plurality of tests of said connected piece of equipment, means in said testing circuit responsive to the correct operation of said piece of equipment in response to said plurality of tests to cause said connecting means to connect said test circuit with another piece of equipment, class of trouble indicating means in said testing circuit, means responsive to the faulty operation of said piece of equipment in response to one of said plurality of tests for operating one of said indicating means, a recording device, means under the control of any one of said indicating means to operate said recording device, means responsive to the operation of said recording device and under the selective control of said indicating means to cause said testing circuit to repeat said plurality of tests on said one piece of equipment, means responsive to the operation of any one of said indicating means during said repeat tests to operate said recording device a second time, an alarm, means normally responsive to said second operation of said recording device to operate said alarm, and means selectively controlled by said indicating means for causing said second operation of said recording device to operate said connecting means to connect said testing circuit with another piece of equipment.

11. A routine testing circuit for testing a plurality of pieces of automatic telephone equipment, means in said testing circuit to connect with said pieces of equipment in succession, means responsive to the connection of said testing circuit with one of said pieces of equipment to make a plurality of tests of said connected piece of equipment, means in said testing circuit responsive to the correct operation of said piece of equipment in response to said plurality of tests to cause said connecting means to connect said test circuit with another piece of equipment, class of trouble indicating means in said testing circuit, means responsive to the faulty operation of said piece of equipment in response to one of said plurality of tests for operating one of said indicating means, a recording device, means under the control of any one of said indicating means to operate said recording device, means responsive to the operation of said recording device and under the selective control of said indicating means to cause said testing circuit to repeat said plurality of tests on said one piece of equipment, means responsive to the operation of certain of said indicating means during said repeat tests to operate said recording device a second time, an alarm, means normally responsive to said second operation of said recording device to operate said alarm, and means under the control of a particular one of said indicating means for causing said second operation of said recording device to operate said connecting means to connect said testing circuit with another piece of equipment.

No references cited.